(12) United States Patent
Pan et al.

(10) Patent No.: US 6,400,869 B2
(45) Date of Patent: Jun. 4, 2002

(54) TUNABLE COMPENSATION FOR POLARIZATION-MODE DISPERSION USING A BIREFRINGENT NONLINEARLY-CHIRPED BRAGG GRATING IN A DUAL-PASS CONFIGURATION

(75) Inventors: Zhongqi Pan; Yong Xie, both of Los Angeles; Sanggeon Lee, Union City; Alan E. Willner, Los Angeles, all of CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/728,945

(22) Filed: Dec. 1, 2000

Related U.S. Application Data

(60) Provisional application No. 60/168,958, filed on Dec. 3, 1999.

(51) Int. Cl.[7] .................................................. G02B 6/34
(52) U.S. Cl. ............................ 385/37; 385/10; 385/11
(58) Field of Search ............................... 385/37, 10, 11, 385/24, 27, 43; 359/130, 188, 120; 372/6, 102

(56) References Cited

U.S. PATENT DOCUMENTS 5,982,963 A  * 11/1999  Feng et al. .................... 385/37

* cited by examiner

Primary Examiner—Phan T. H. Palmer
(74) Attorney, Agent, or Firm—Fish & Richardson, PC

(57) ABSTRACT

Techniques and devices for compensating polarization-mode dispersion in an optical signal by using a nonlinearly-chirped Bragg grating in a dual-pass configuration.

24 Claims, 4 Drawing Sheets

TUNABLE COMPENSATION FOR POLARIZATION-MODE DISPERSION USING A BIREFRINGENT NONLINEARLY-CHIRPED BRAGG GRATING IN A DUAL-PASS CONFIGURATION

This application claims the benefit of U.S. Provisional Application No. 60/168,958, filed on Dec. 3, 1999 and entitled CHIRP-FREE TUNABLE PMD COMPENSATION USING HI-BI NONLINEARLY-CHIRPED FBGS IN A DUAL-PASS CONFIGURATION.

TECHNICAL FIELD

This application relates to compensation for optical dispersion, and more specifically, to techniques and systems for reducing polarization-mode dispersion in optical media such as optic fiber links.

BACKGROUND

Dispersion in optical transmission media such as optic fibers can cause optical waves of different characteristics to travel at different speeds. An optical pulse with optical components of different characteristics, therefore, can be broadened after propagation through a distance through a dispersive optical medium. The dispersion is undesirable for applications where information is encoded, processed, and transmitted through optical pulses because the pulse broadening caused by the dispersion can limit the transmission bit rate, the transmission bandwidth, and other performance factors of an optical communication system.

Different dispersive effects can occur in an optical waveguide. For example, the material dispersion in a waveguide can cause different spectral components within an optical pulse to travel at different group velocities. Different waveguide modes in a waveguide can also experience a waveguide dispersion to travel at different group velocities. In addition, some optical materials used for transporting optical pulses may be birefringent so that light with different polarizations can experience different indices of refraction. This can cause a polarization-mode dispersion ("PMD") in optical waveguides independent of other dispersive effects. Typical causes for PMD in some fibers include, among others, imperfect circular core and unbalanced stress in a fiber along different transverse directions perpendicular to the fiber core.

PMD is one of key limitations to the performance of high-speed optical fiber communication systems at or above 10 Gbits/s due to the fiber birefringence. Fibers with significant PMD (e.g., about 1 to 10 $ps/km^{1/2}$) are used in various fiber networks, particularly in those that were deployed in 1980's and early 1990's. Hence, the compensation of PMD is desirable for high-speed transmission that uses such PMD fiber systems.

SUMMARY

The techniques and devices of this application include optical devices that use a nonlinearly-chirped Bragg grating formed in a birefringent material in a dual-pass configuration. One embodiment of the devices includes a grating coupled to an optical wave-guiding path and a polarization rotator in the optical wave-guiding path to rotate a light polarization by about 90 degrees. The grating is adapted to have a periodic spatial pattern that changes nonlinearly with a position along an optical path from a first grating distal end to a second grating distal end in the grating. The grating also provides different refractive indices for light polarizations along first and second polarization axes that are substantially perpendicular to the optical path. The optical wave-guiding path has a first distal end coupled to receive light from the first grating distal end and a second distal end coupled to direct that light to the second grating distal end.

The grating or the optical wave-guiding path may be implemented by using optical fibers or waveguides formed on substrates. In a fiber implementation, for example, such a device may include a first optic fiber to transport optical energy and to exhibit optical birefringence for light polarizations along first and second polarization axes that are substantially perpendicular to the fiber.

A fiber grating is formed between a first location and a second location in the first fiber to have a periodic spatial pattern that changes nonlinearly with a position along the first fiber. This fiber grating is operable to effectuate different relative delays in reflected optical spectral components of a common polarization of different wavelengths at different positions along the fiber grating that meet Bragg conditions. It is also operable to effectuate different relative delays between two reflected optical spectral components of different light polarizations respectively along the first and second polarization axes at a common wavelength. Thus, the fiber grating can interact with an input optical signal traveling from the first location towards the second location in the first fiber to produce a first optical signal by reflection in a direction from the second location towards the first location.

This fiber implementation may also include a second fiber having a first distal end and a second, opposite distal end. In addition, a polarization rotator is coupled between the first and second distal ends in the second fiber to rotate a light polarization by about 90 degrees. The first distal end is coupled to the first fiber at a position to receive the first optical signal through the first location. The second distal end is coupled to the first fiber at a different position to direct the first optical signal, after passing through the polarization rotator, back into the fiber grating at the second location. The fiber grating then operates to reflect the first optical signal for the second time to produce an output optical signal directing from the first location towards the second location.

These and other embodiments and associated features are set forth in the accompanying drawings, the description, and the claims.

BRIEF DESCRIPTION OF THE DRAWINGS

Like reference symbols in the various drawings indicate like elements.

ETAILED DESCRIPTION

Figure 1:
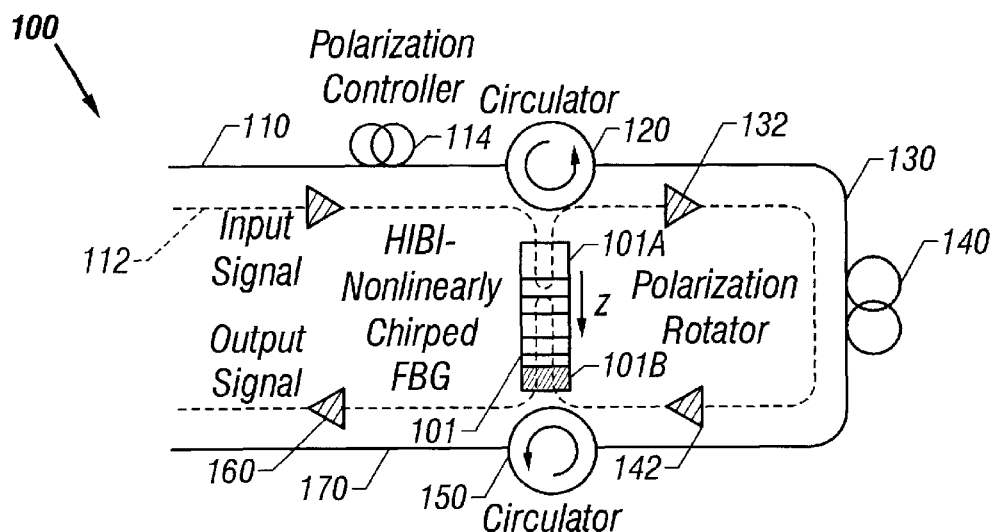
FIG. 1 shows one embodiment of a fiber device that uses a nonlinearly chirped Bragg grating formed in a fiber in a dual-pass configuration.

The techniques of this disclosure are in part based on the recognition that PMD in a received optical channel is not static but can vary with time in an unpredictable manner due to a variety of factors. For example, variations in PMD may be caused by environmental factors such as variations or fluctuations in stress and temperature in the actual optical path of that optical channel. For another example, the physical optical path for a particular optical channel may change from time to time to alter the total PDM in the transmitted channel if the associated fiber network can be dynamically reconfigured. In addition, different spectral components at different wavelengths may experience different amounts of dispersion and the changes in dispersion for different spectral components may also be different. Therefore, it is desirable that a PMD compensator be tunable to adjust the varying amount of the dispersion compensation according to the changing PMD in a received optical signal.

It is further recognized that, a nonlinearly-chirped Bragg grating can be used to provide different amounts of dispersion compensation for different spectral components at different wavelengths. Notably, a nonlinearly-chirped Bragg grating may be dynamically controlled to adjust the amounts of dispersion compensation at different wavelengths and to change the relative amounts of dispersion compensation for different wavelengths. See, U.S. Pat. No. 5,982,963 to Feng et al. In addition, such a nonlinearly-chirped Bragg grating, when formed in an optical birefringent material, can be used to produce different amounts of dispersion compensation of different polarizations. Such polarization-dependent compensation is also adjustable by controlling the nonlinearly-chirped fiber grating. See, U.S. patent application Ser. No. 09/253,645, filed on Feb. 19, 1999 by Cai et al.

One aspect of the techniques of this disclosure is to improve the above dispersion compensation based on nonlinearly-chirped Bragg gratings by providing a dual-pass configuration. According to one embodiment, an input optical signal is fed into a birefringent nonlinearly-chirped Bragg grating from a first side of the grating. The grating interacts with the input signal to produce a reflected optical signal that has signal components satisfying the Bragg conditions in the grating. The reflected signal is processed outside the fiber grating by rotating each polarization by about 90 degrees to produce a polarization-rotated reflected signal. This signal is then fed into the grating for the second time from a second, opposite side of the grating. Thus, the signal travels in the grating along a direction opposite to the direction in the first time. Again, the grating interacts with the polarization-rotated reflected optical signal to reflect it back as an output signal.

This dual-pass technique may be used to produce an amount of PMD compensation in the output signal twice as much in the signal that is reflected by the grating only once. In particular, after passing through the grating twice, a frequency chirp introduced by the grating may be significantly reduced in the output signal in comparison to the frequency chirp in the signal produced by a single reflection in the grating. In combination with the tunable capability of the nonlinearly-chirped grating, this dual-pass technique may provide an efficient and versatile PMD compensator for many applications.

For example, the grating may be formed in a fiber so that this PMD compensator can be fully compatible with other fiber devices and systems. Thus, this PMD compensator can be integrated with a fiber device or system as an in-fiber compensator. Such a PMD compensator based on a fiber may also be made relatively compact in size. In addition to dispersion compensation, this PMD compensator may be used to form fiber sensors, optical phase shifter, optical filter, and devices for optical signal processing.

FIG. 1 shows one embodiment of a fiber device 100 that uses a nonlinearly-chirped Bragg grating 101 formed in a fiber in a dual-pass configuration. The nonlinearly-chirped grating 101 may include a grating that has an effective index $n_{neff}(z)$ and the grating period $\Lambda(z)$ to form a periodic spatial pattern defined by the grating parameter $n_{neff}(z)\Lambda(z)$ that changes nonlinearly with the position z along the fiber optic axis. Such a grating reflects optical waves satisfying a Bragg condition of $\lambda(z)=2n_{neff}(z)\Lambda(z)$. A single Bragg reflection band is generated where the bandwidth is determined by the chirping range of the grating parameter $n_{neff}(z)\Lambda(z)$. One way to implement a nonlinearly-chirped grating parameter $n_{neff}(z)\Lambda(z)$, for example, is to modulate the amplitude or phase of the refractive index of the fiber to have a grating period $\Lambda(z)$ that changes nonlinearly with z.

The grating 101 is formed between two locations 101A and 101B in the underlying fiber. The grating parameter may nonlinearly decrease from the location 101A to the location 101B so that, when the input signal 112 enters the grating 101 from the location 101A to travel towards 101B, spectral components with long wavelengths are reflected back before the spectral components with short wavelengths are reflected. This provides a negative dispersion on the reflected signal. When a signal enters the grating 101 from the location 102B to travel towards 101A, however, a positive dispersion is generated in reflected spectral components of the input signal. Hence, when a signal is first reflected from one side of the grating 101 and then is injected back into the grating 101 from the opposite side, any chirp imposed on the signal by the first reflection may be substantially canceled by the second reflection. Alternatively, the grating parameter may nonlinearly increase from the location 101A to the location The underlying fiber that supports the grating 101 may exhibit optical birefringence for light polarizations along first and second principal polarization axes that are substantially perpendicular to the fiber optic axis. For example, a high-birefringence photosensitive fiber or a polarization-maintaining fiber may be used to achieve a large difference in refractive indices between the two principal polarization axes. The difference in the indices of refraction for the two principal polarization axes may be on the order of $10^{-4}$ or greater (e.g., $5\times10^{-4}$) at or near a selected wavelength for the optical signal to be filters, e.g., 1550 nm. In one implementation, the grating 101 may be written on a photosensitive highly birefringent fiber through a nonlinearly-chirped phase mask using near-UV light at about 300 nm. The grating 101 may be 15 cm long and nonlinearly chirped from 1547.2 nm to 1550.5 nm for two orthogonal principal polarization axes.

The high-birefringence fiber provides different time delays for different states of polarization. The nonlinear chirp allows tuning of relative delays of different spectral components in each state of polarization and a frequency shift in the reflective spectral band. At a given location in the fiber grating 101, the reflected signals of the orthogonal polarizations have two different wavelengths that are $$\Delta\lambda = \frac{n_s - n_f}{n - n_{cl}}\lambda_g,$$

separated by $\Delta\lambda$:
where $n_s$, $n_f$, $n$, and $n_{cl}$, respectively represent the refractive indices along the slow axis and fast axis, and in the fiber core and cladding, and $\lambda_g$ is average of the resonant wavelengths along the fast and slow axes.

The fiber device 100 uses an input fiber 110 to receive an input optical signal 112 to direct it into the grating 101 from the location 101A and another fiber 130 for directing the reflected signal 132 to the opposite side 101B. A polarization controller 114 may be coupled in the input fiber 110 to adjust or control the polarizations of the input signal 112. An optical circulator 120 is coupled to the fibers 110, 130, and the grating 101 to direct the input signal 112 into the side 110A of the grating 101 and the reflected signal 132 into the fiber 130. A polarization-rotating element 140 is placed in the fiber 130 to rotate each polarization in the signal 132 by about 90 degrees to produce a polarization-rotated reflected signal 142. A Faraday rotator, a fiber polarization controller, a birefringent wave plate, or other types of polarization rotators may be used to implement the element 140. The fiber 130 should be a polarization-maintaining fiber to preserve the polarization of the signal 132 and the polarization of the signal 142 with respect to the principal polarization axes of the birefringent grating 101. A second optical circulator 150 is used to direct the signal 142 into the side 101B of the grating 101. An output fiber 170 is also coupled to the circulator 150 to receive an output signal 160 that is generated from reflection of the signal 142 by the grating 101.

Figure 2A:
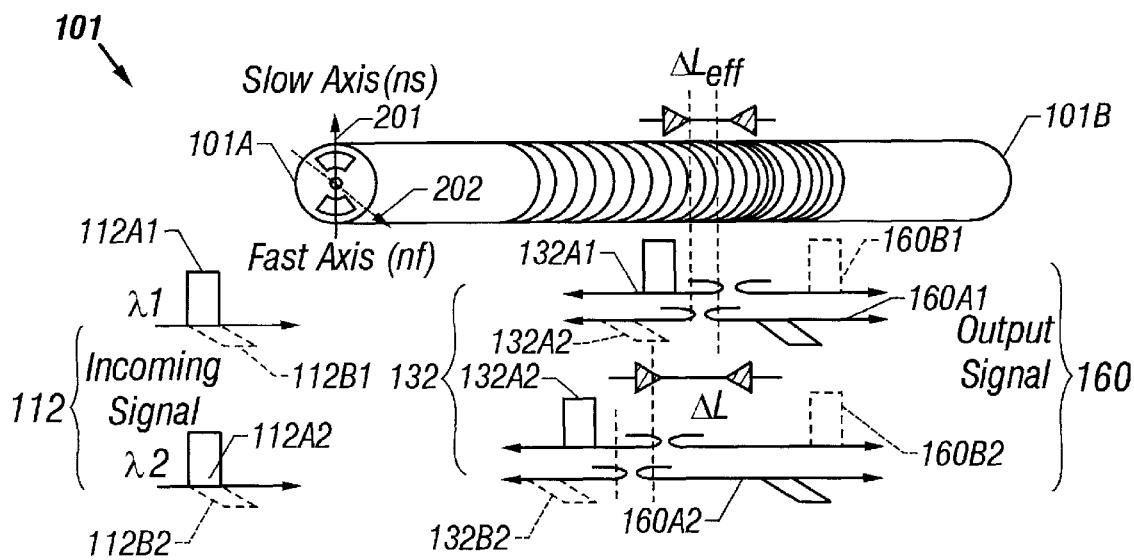
FIGS. 2A and 2B illustrates delays in signal components at different wavelengths and in different polarizations in the dual-pass configuration shown in FIG. 1.

FIG. 2A illustrates the operation of the device 100 in FIG. 1, where it is assumed that the grating parameter nonlinearly decreases from the first end 101A to the second end 101B. The input signal 112 includes spectral components at different wavelengths along two different polarization axes 201 (e.g., the slow axis) and 202 (e.g., the fast axis) of the grating 101, such as spectral components 112A1 and 112B1 at a first wavelength $\lambda_1$ of different polarizations respectively along axes 201 and 202 and spectral components 112A2 and 112B2 at a second wavelength $\lambda_2$ ($>\lambda_1$) of different polarizations respectively along axes 201 and 202. After entering the side 101A and upon the first reflection by the grating 101, the component 112A1 becomes 132A1 and is delayed relative to the reflected component 132B1 at the same wavelength $\lambda_1$ by the reflection of the component 112B1. This relative delay between 132A1 and 132B1 is caused by the birefringence in the grating 101. Similarly, reflected components 132A2 and 132B2 produced by reflections of the components 112A2 and 112B2 are also delayed relative to each other. But the nonlinear chirping of the grating 101 causes another relative delay between the reflected components 132A1, 132B1 at the first wavelength $\lambda_1$ and the reflected components 132A2, 132B2 at the second wavelength $\lambda_2$. Although caused by different mechanisms in the grating 101, both types of delays are dictated by the Bragg conditions $\lambda(z)=2n_{neff}(z)\Lambda(z)$.

The reflected signal 132, which includes reflected components such as 132A1, 132B1, 132A2, and 132B2, is then directed by the fiber 130 to the polarization rotator 140 where each polarization is rotated by about 90 degrees. The rotated signal 142 is fed into the grating 101 for the second time, but from the opposite end 101B. Hence, a component that was polarized along the polarization 201 during the first reflection is now polarized along the polarization 202, or vice versa. Consequently, a spectral component polarized along one polarization axis in the first reflection is now reflected at a position different the reflected position in the first reflection. As illustrated in FIG. 2A, this different reflection position substantially coincides with a position at which an orthogonally polarized component at the same wavelength in the first reflection was reflected. For example, the component 132B1, after its polarization being rotated by 90 degrees, is reflected as the component 160B1 in the second reflection at the same location as the component 132A1 was reflected in the first reflection. Therefore, the delay between two different polarized components at the same wavelength is essentially doubled after the second reflection.

Figure 2B:
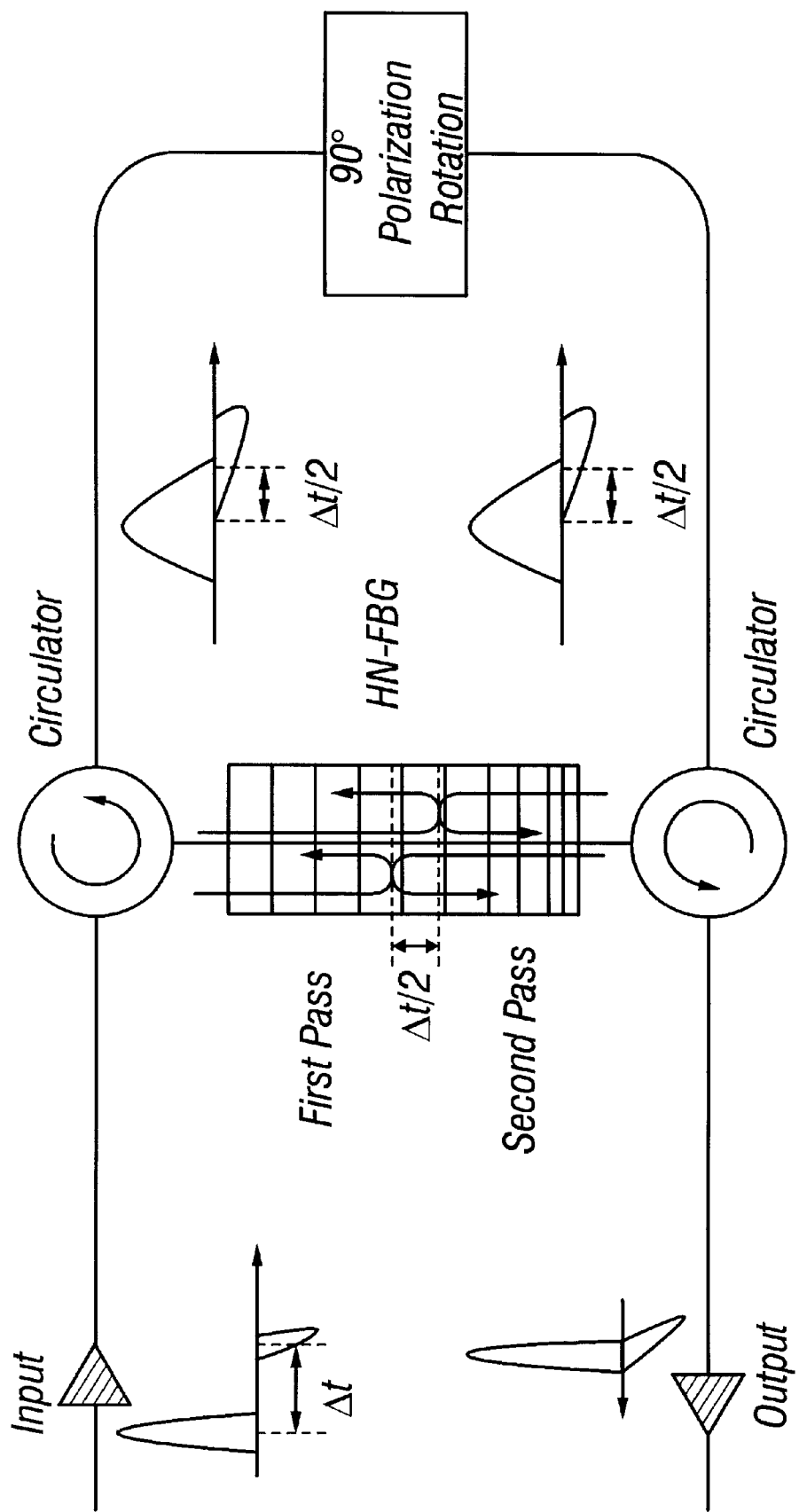

FIG. 2B further illustrates the operation of the dual-pass device 100 of FIG. 1 on two polarization components 210 and 220 of the same wavelength. The birefringence of the grating 101 may be designed so that the initial PMD in input signal in only partially compensated during the first pass. Hence, after the second pass from the opposite side of the grating, the residual PMD is substantially compensated and the frequency chirp caused by the grating is also removed.

Another feature of the device 100 is the tunability in changing the relative delays between any two different signal components at two different wavelengths. FIG. 3A illustrates that the overall length of the grating 101 may be changed so that a delay between two different wavelengths after the change is different from the delay between the same two wavelengths before the change. This combination of the birefringence of the fiber and the nonlinear chirping of the grating provides a tuning mechanism for adjusting the relative delays between two polarization states by mechanical stretching of the grating 101.

Figure 3B:
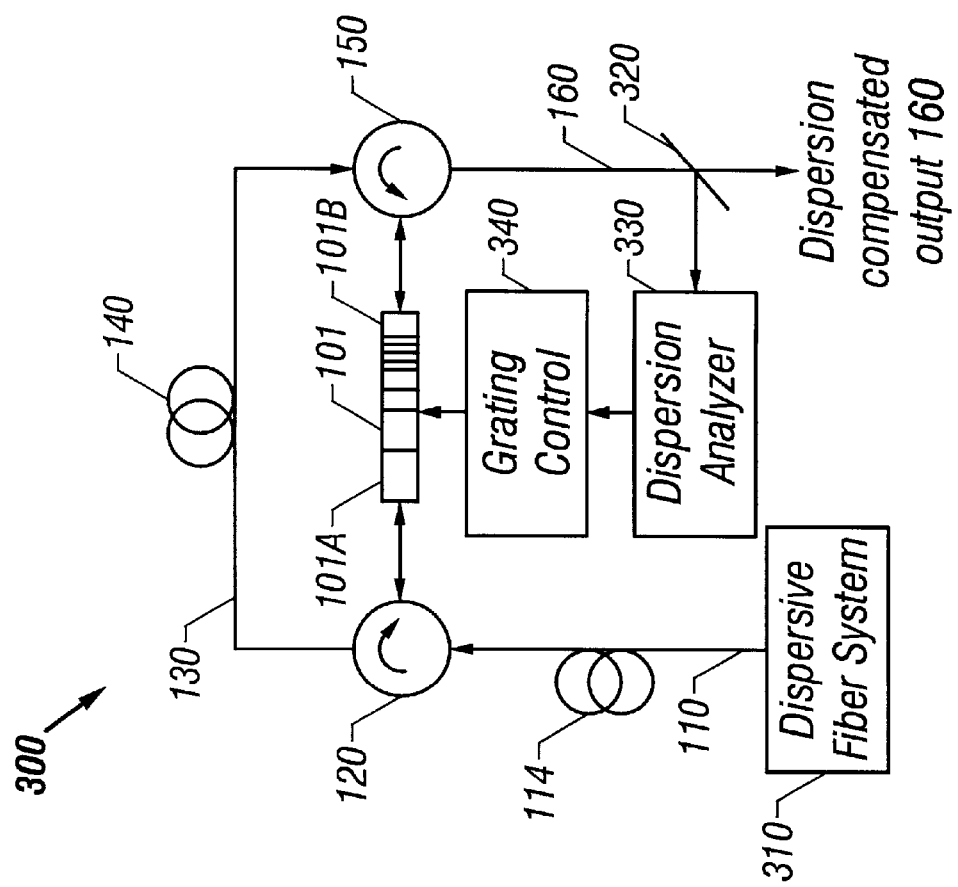
FIG. 3B shows one embodiment of a tunable dispersion compensator based on the device shown in FIG. 1.
Figure 3A:
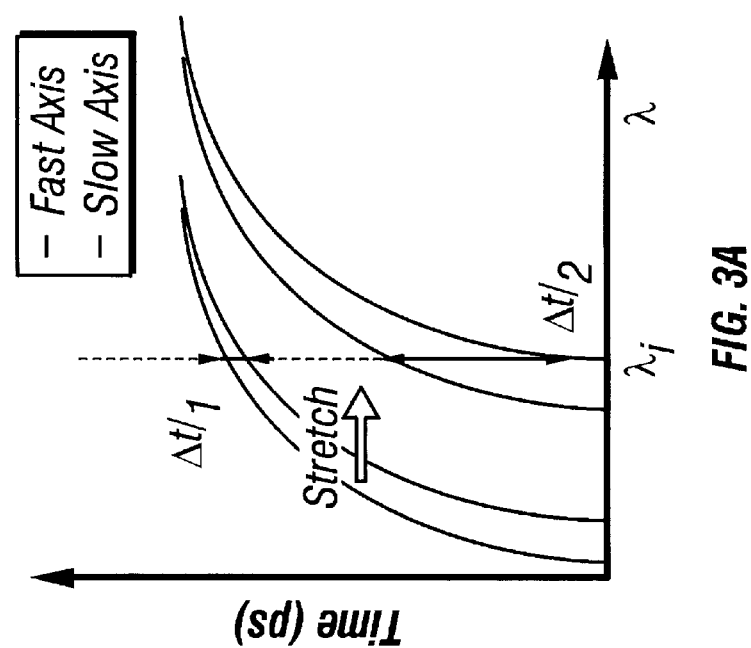
FIG. 3A illustrates the tunability of nonlinearly-chirped Bragg gratings by showing different relative delays at different wavelengths and different polarizations caused by stretching a nonlinearly-chirped Bragg fiber grating.

FIG. 3B shows one embodiment of a tunable device 300 based on the device 100 in FIG. 1. A grating control unit 340 is coupled to interact with the fiber grating 101 to cause a change in the grating parameter $n_{neff}(z)\Lambda(z)$ to vary the relative delay between different spectral components. This may be achieved by changing one of the effective index $n_{neff}(z)$ and the grating period $\Lambda(z)$. For example, a fiber stretcher may be used as the control unit 340 to control the length of the fiber grating 101 to change the grating period $\Lambda(z)$. A dispersion detection module 330 can be used to monitor the PMD of the output signal 160 to produce a PMD indication signal. The control unit 340 then responds to this PMD indication to adjust the grating 101 accordingly to reduce the dispersion in the output 160. This device 300 is dynamic because the grating 101 can be controlled to produce a varying amount of dispersion for compensation as the dispersion in the input signal 110 from the dispersive system 310 changes.

Figure 4A:
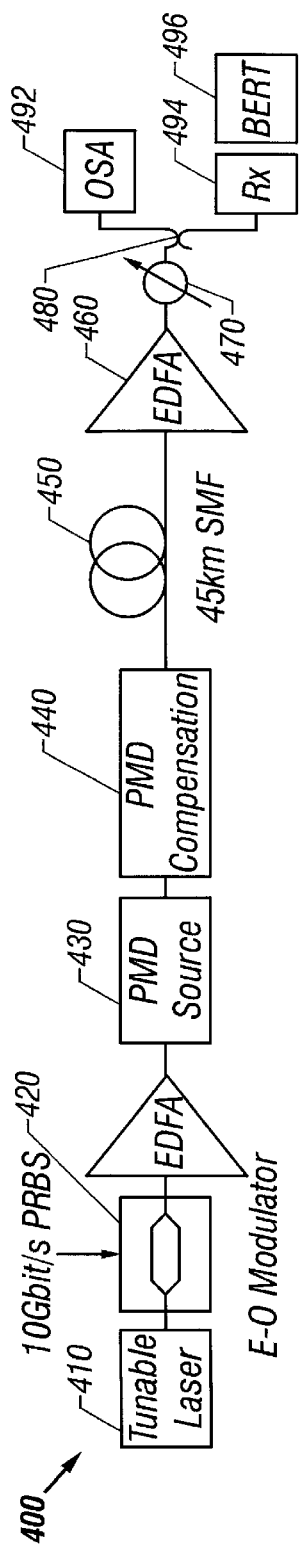
FIG. 4A shows an exemplary system for characterizing the performance of a fiber device shown in FIG. 1.

FIG. 4A shows an exemplary system 400 for characterizing the performance of a fiber device 100 shown in FIG. 1. a tunable laser 410 is modulated by an electro-optic modulator 420 (e.g., a Mach-Zehnder modulator) to superimpose a 10 Gbit/s PRBS on its output laser beam. A PMD source 430, e.g., a free-space variable time delay device, can be used to introduce PMD in the beam. The PMD may be from 250 to 500 ps in DGD. A nonlinearly-chirped fiber grating compensator 440 is used to compensate for the introduced dispersion. The output of the compensator 440 is then sent through a single-mode fiber line 450 of about 45 km. Both single-pass fiber grating and dual-pass compensator 100 are used as the compensator 440.

Figure 4C:
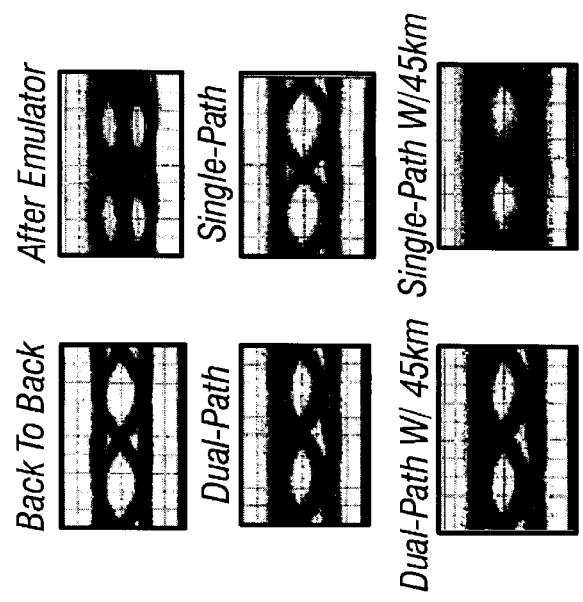
FIGS. 4B and 4C show measured results from the system in FIG. 4A.
Figure 4B:
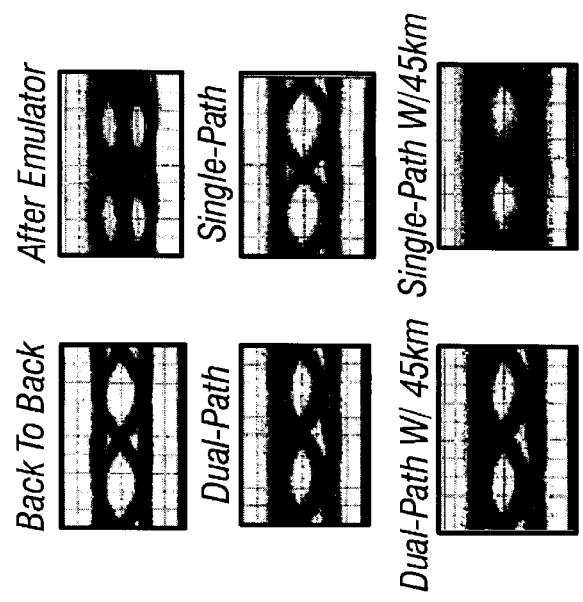

FIGS. 4B and 4C respectively show measured bit error rates (BERs) and eye diagrams from the system 400 in FIG. 4A. The transmitted power is about 23 to 25 dB lower than the reflected power of the nonlinearly-chirped grating in the compensator 440 due to the poor quality of the specific grating was used for the test. At the output of the compensator 440, the dual-pass compensator suffers more power penalty than the single-pass compensator. However, after transmission through the fiber link 450, the power penalty of the dual-pass signal is only about 0.5 dB while the single-pass signal is about 4 dB. Hence, the dual-pass compensator has much better performance than the single-pass compensator. The eye diagrams in FIG. 4C show that the signal-to-noise ratio in a signal processed by the dual-pass compensator is not significantly degraded while the signal from the single-pass compensator shows pronounced degradation. A PMD emulator is used to generate the PMD in an optical signal to simulate the actual PMD in fibers in the eye diagram measurements.

Although the present disclose only includes a few examples, it is understood that various modifications and enhancements may be made. For example, the nonlinear-chirped grating may be formed in an optical wave-guiding conduit other than a fiber, such as a waveguide formed on a substrate. Other optical configurations may also be used to implement the dual-pass configuration.

What is claimed is:

1. An optical fiber device, comprising:
   a first optic fiber to transport optical energy and to exhibit optical birefringence for light polarizations along first and second polarization axes that are substantially perpendicular to said first fiber;
   a fiber grating formed between a first location and a second location in said first fiber to have a periodic spatial pattern that changes nonlinearly with a position along said first fiber to effectuate different relative delays in reflected optical spectral components of a common polarization of different wavelengths at different positions along said fiber grating that meet Bragg conditions and different relative delays between two reflected optical components of different light polarizations respectively along said first and second polarization axes at a common wavelength, said fiber grating operable to interact with an input optical signal traveling from said first location towards said second location in said first fiber to produce a first optical signal by reflection in a direction from said second location towards said first location;
   a second fiber having a first distal end coupled to said first fiber at a position to receive said first optical signal through said first location, and a second distal end coupled to said first fiber at a different position to direct said first optical signal back into said fiber grating at said second location, wherein said fiber grating operates to reflect said first optical signal to produce an output optical signal directing from said first location towards said second location; and
   a polarization rotator coupled in said second fiber to rotate a light polarization by about 90 degrees.

2. The device as in claim 1, further comprising an input fiber coupled to said first fiber to direct said input optical signal into said fiber grating through said first location, and an output fiber coupled to said first fiber to receive said output optical signal from said fiber grating through said second location.

3. The device as in claim 2, further comprising:
   a first optical circulator to couple said input fiber, a first distal end of said first fiber near said first location, and said first distal end of said second fiber together to direct said input signal from said input fiber into said fiber grating and said first optical signal from said fiber grating into said second fiber; and
   a second optical circulator to couple said output fiber, a second distal end of said first fiber near said second location, and said second distal end of said second fiber together to direct said first optical signal from said second fiber into said fiber grating and said output optical signal from said fiber grating into said output fiber.

4. The device as in claim 2, further comprising a polarization controller in said input fiber to control a polarization in said input optical signal.

5. The device as in claim 1, further comprising a grating control unit coupled to said first fiber and operable to change a property of said periodic spatial pattern of said fiber grating to vary relative time delays of different spectral components in said first and said output optical signals.

6. The device as in claim 5, wherein said grating control is operable to change a length of said first fiber.

7. The device as in claim 5, further comprising a dispersion detection unit coupled to receive a fraction of said output optical signal and to measure an amount of dispersion in said output signal to produce a control signal, and wherein said grating control unit is operable to change said property of said periodic spatial pattern in according to said control signal to reduce said dispersion in said output signal.

8. The device as in claim 7, wherein said dispersion detection unit is operable to measure a polarization-mode dispersion.

9. The device as in claim 1, wherein said periodic spatial pattern includes a modulation in a refractive index of said first fiber whose spatial period nonlinearly decreases or increases from said first location to said second location.

10. A method for compensating for optical dispersion in an input optical signal, comprising:
    directing the input optical signal into a first optic fiber through a first distal end to propagate towards a second distal end, said first fiber configured to exhibit optical birefringence for light polarizations along first and second polarization axes that are substantially perpendicular to said first fiber, said first fiber further configured to have a fiber grating formed between a first location near said first distal end and a second location near said second distal end to have a periodic spatial pattern that changes nonlinearly with a position along said first fiber to effectuate different relative delays in reflected optical spectral components of a common polarization of different wavelengths at different positions along said fiber grating that meet Bragg conditions and different relative delays between two reflected optical components of different light polarizations respectively along said first and second polarization axes at a common wavelength;
    directing a reflected optical signal in a direction from said second location towards said first location generated by reflection of said input optical signal in said fiber grating outside said fiber grating;
    rotating each polarization in said reflected optical signal by about 90 degrees to produce a polarization-rotated reflected optical signal; and
    directing said polarization-rotated reflected optical signal back into said fiber grating to travel from said first location towards said second location in said first fiber to produce an output signal from reflection of said polarization-rotated reflected optical signal.

11. The method as in claim 10, further comprising changing a property of said periodic spatial pattern of said fiber grating to vary relative time delays of different spectral components in said reflected optical signal and said output optical signal.

12. The method as in claim 11, wherein said property of said periodic spatial pattern includes a length of said fiber grating.

13. The method as in claim 11, further comprising:
    measuring an amount of optical dispersion in said output optical signal; and
    adjusting said property of said periodic spatial pattern according to the measured optical dispersion to reduce said optical dispersion.

14. The method as in claim 13, wherein said optical dispersion includes a polarization-mode dispersion.

15. An optical device, comprising:
- a grating adapted to have a periodic spatial pattern that changes nonlinearly with a position along an optical path from a first grating distal end to a second grating distal end along said grating and to have different refractive indices for light polarizations along first and second polarization axes that are substantially perpendicular to said optical path;
- an optical wave-guiding path having a first distal end coupled to receive light from said first grating distal end and a second distal end coupled to direct said light to said second grating distal end; and
- a polarization rotator coupled in said optical wave-guiding path to rotate a light polarization of said light by about 90 degrees.

16. The device as in claim 15, further comprising a grating control unit coupled to change a property of said grating to alter a relative delay between two spectral components of different wavelengths in an optical signal, wherein said optical signal is directed to said grating for the first time from the first grating distal end, and, after passing through the polarization rotator in the said optical wave-guiding path, is then directed into the grating for the second time from the second grating distal end.

17. The device as in claim 16, wherein said property of said grating includes an overall length of said grating.

18. The device as in claim 16, wherein said grating control unit is operable to change said property differently in response to different measurements of optical dispersion in an output optical signal generated from said second grating distal end.

19. The device as in claim 15, wherein said grating is formed in a birefringent fiber.

20. The device as in claim 15, wherein said grating includes a waveguide fabricated over a substrate.

21. The device as in claim 15, wherein said optical wave-guiding path includes a fiber that is configured to preserve a state of polarization of a beam propagating therein.

22. A method, comprising:
- directing an optical signal into a first grating distal end of a fiber grating adapted to have a periodic spatial pattern that changes nonlinearly with a position from the first grating distal end to a second grating distal end along said fiber grating and to have different refractive indices for light polarizations along first and second polarization axes that are substantially perpendicular to said fiber grating;
- receiving a first reflected optical signal from the first grating distal end that is produced by the fiber grating by reflecting the optical signal;
- rotating a light polarization of the first reflected optical signal by about 90 degrees to produce a rotated first reflected optical signal; and
- directing the rotated first reflected optical signal into the fiber grating from the second grating distal end to produce a second reflected optical signal at the second grating distal end.

23. The method as in claim 22, further comprising changing a length of said fiber grating to change relative delays of different spectral components at different wavelengths in said optical signal.

24. The method as in claim 22, wherein a polarization rotator is used to produce the rotated first reflected signal, and further comprising:
- preserving a state of polarization of the first reflected optical signal when directing the first reflected optical signal from the first grating distal end of the fiber grating to the polarization rotator; and
- preserving a state of polarization of the rotated first reflected optical signal when directing the rotated first reflected optical signal from the polarization rotator to the second grating distal end of the fiber grating.

* * * * *

UNITED STATES PATENT AND TRADEMARK OFFICE
CERTIFICATE OF CORRECTION

PATENT NO. : 6,400,869 B2
DATED : June 4, 2002
INVENTOR(S) : Zhongqi Pan, Yong Xie, Sanggeon Lee and Alan E. Willner It is certified that error appears in the above-identified patent and that said Letters Patent is hereby corrected as shown below:

Column 1,
Line 12, before "TECHNICAL FIELD", please insert the following:

-- STATEMENT AS TO FEDERALLY-SPONSORED RESEARCH
   This invention was made with government support under contract No. F30602-98-1-0196 awarded by the United States Air Force. The government has certain rights in this invention. --

Column 3,
Line 1, please change "ETAILED DESCRIPTION" to -- DETAILED DESCRIPTION --.

Signed and Sealed this

Third Day of December, 2002

JAMES E. ROGAN
*Director of the United States Patent and Trademark Office*